June 13, 1933.  E. L. DENNIS  1,914,082
AUTOMATIC FLUID PRESSURE CONTROL
Filed Nov. 12, 1931  3 Sheets-Sheet 1
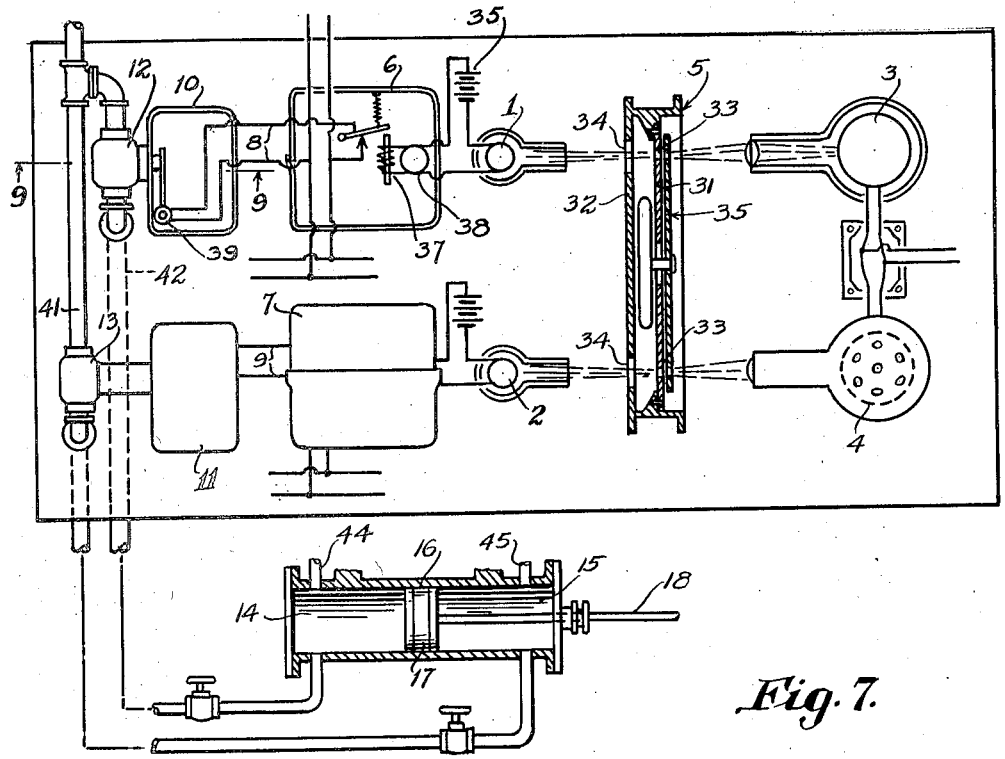
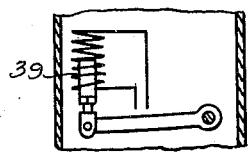
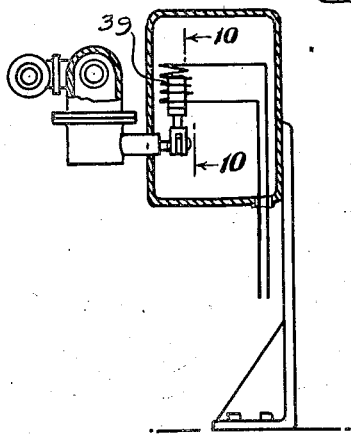
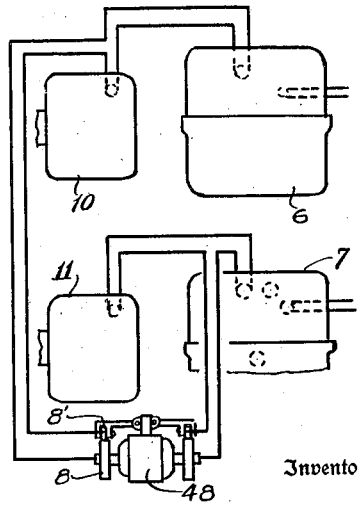
Inventor
Edwin L. Dennis
By Mason Fenwick & Lawrence
Attorneys June 13, 1933. E. L. DENNIS 1,914,082
AUTOMATIC FLUID PRESSURE CONTROL
Filed Nov. 12, 1931 3 Sheets-Sheet 2

Inventor
Edwin L. Dennis
By Mason Fenwick & Lawrence
Attorneys

June 13, 1933.  E. L. DENNIS  1,914,082
AUTOMATIC FLUID PRESSURE CONTROL
Filed Nov. 12, 1931   3 Sheets-Sheet 3
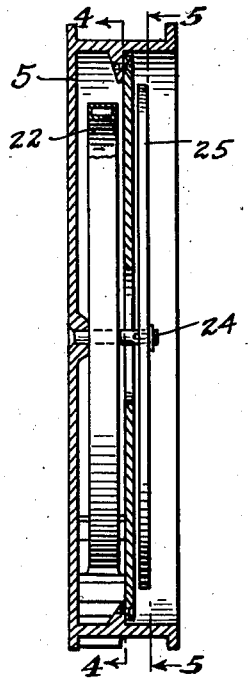
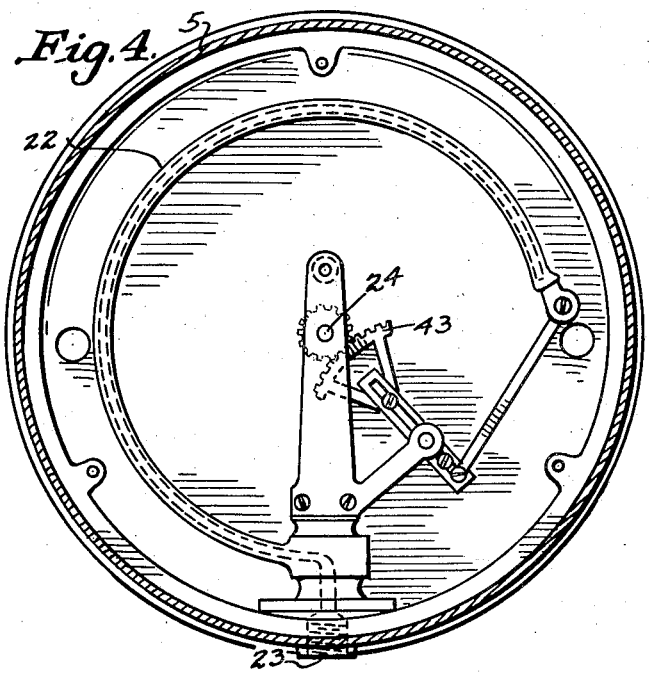
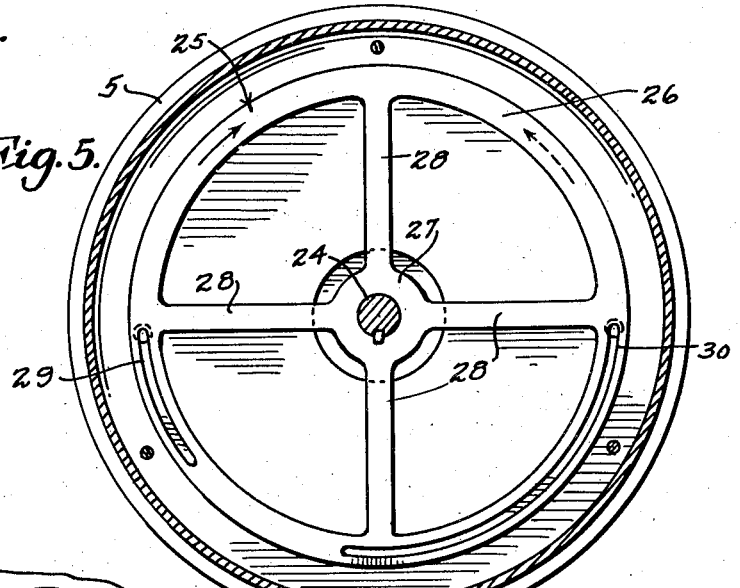
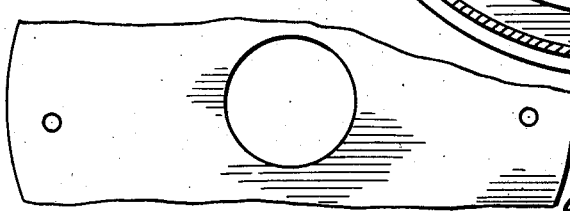
Inventor
Edwin L. Dennis
By Mason Fenwick & Lawrence
Attorneys Patented June 13, 1933

1,914,082

UNITED STATES PATENT OFFICE

EDWIN L. DENNIS, OF RESERVE, LOUISIANA

AUTOMATIC FLUID PRESSURE CONTROL

Application filed November 12, 1931. Serial No. 574,666

This invention relates to the control or stabilization of fluid pressure by means responsive to the pressure to be controlled or stabilized.

One of the objects of the invention is the provision of pressure responsive means for inducing current variations in opposing circuits which either directly or indirectly control the value of the fluid pressure through suitable current actuated instrumentalities.

A more specific object of the invention is to provide photo-electric circuits respectively associated with contra-acting pressure supplying or generating means for a pressure responsive shutter adapted to eclipse one or the other of energizing beams for said circuits, so as to produce a compensating, balancing, or corrective effect on the pressure supplying or generating means, whereby the desired pressure is restored or maintained.

Other objects of the invention will appear as the following description of a preferred and practical embodiment thereof proceeds.

In this connection, it may be stated that while the description is directed to the control of steam pressure in a boiler heated by gas burning furnace, by controlling the fuel supply and draft conditions in the furnace, it is to be understood that the invention is not limited to any specific pressure generating system, but to any situation in which pressure is to be regulated or maintained.

In the drawings, in which the same characters of reference have been employed throughout the several views to denote identical parts, and which form a part of the specification:

Figure 1 is a plan view largely diagrammatic of a constant pressure maintaining system embodying the principles of the present invention;

Figure 3 is a vertical section through the pressure responsive control means;

Figure 4 is a section taken along the line 4—4 of Figure 3;

Figure 5 is a section taken along the line 5—5 of Figure 3;

Figure 6 is a fragmentary plan view of the back wall of the casing of the pressure responsive control device;

Figure 7 is a fragmentary plan view of part of the system shown in Figure 1 slightly modified by the intercalation of a time control mechanism;

Figure 8 is a section taken along the line 8—8 of Figure 7 showing one of the commutators and brushes;

Figure 9 is a section taken along the line 9—9 of Figure 1; and

Figure 10 is a side sectional view showing the valve actuating solenoid and its connection to the valve pintle.

Figure 2:
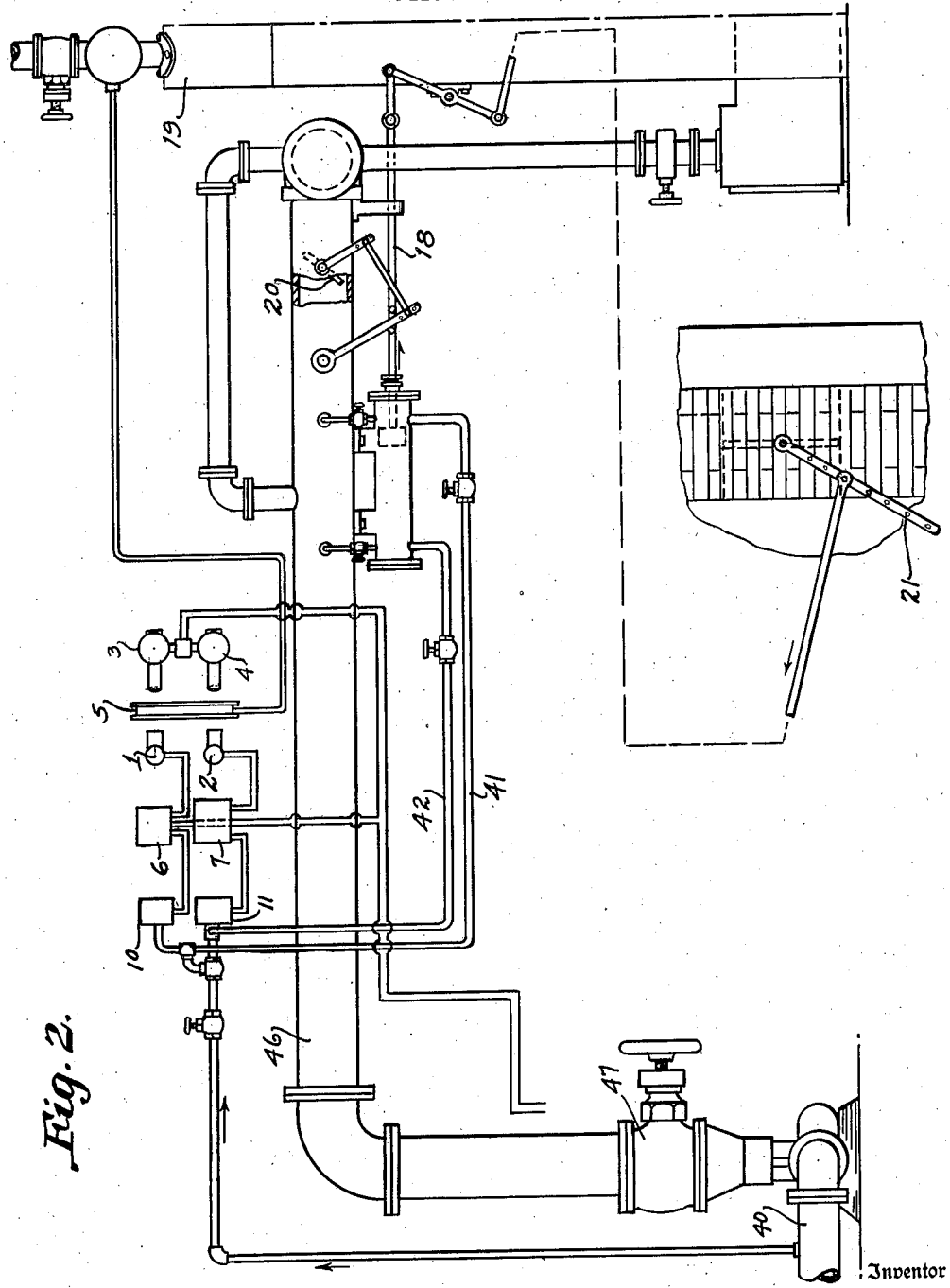
Figure 2 is a vertical elevation, some parts being shown in section through a steam generating system using pressure gas as fuel, with means constructed according to the principles of the invention for maintaining the steam pressure constant through automatic control of the fuel supply and draft conditions.

Referring now in detail to the several figures and first adverting to the diagrammatic lay-out shown in Figure 1, the numerals 1 and 2 represent photo-electric cells, normally energized by beams originating from light sources 3 and 4, a pressure responsive shutter mechanism which in general is designated by the reference character 5 intervening, and being arranged to eclipse one or the other or neither of said beams according to pressure conditions to be controlled.

Photo-electric relays 6 and 7 are energized by the currents of the photo-electric cells and they in turn activate circuits 8 and 9 which energizes solenoids within the casings 10 and 11, see Figure 9, for opening or closing valves 12 and 13. Said valves supply fluid under pressure to chambers 14 and 15 within a cylinder 16 and on opposite sides of a piston 17. Said piston has a rod 18 which actuates an instrumentality for affecting, either in an increasing or decreasing manner, pressure conditions in a pressure chamber with which the pressure responsive means 5 is in communication.

Figure 2 shows that the pressure responsive means 5 is in communication with the steam chamber of a boiler 19 and that the piston rod 18 controls, on the one hand, a fuel supply valve 20 and on the other hand, a draft damper 21, thereby modifying combustion conditions so as to increase or decrease the steam pressure within the boiler.

The pressure responsive device 5 through which the photo-electric control is consumated comprises in the present exemplary embodiment of the invention, a pressure gage having a Bourdon tube 22 adapted to be placed into communication with the boiler through a suitable threaded connection 23. The Bourdon tube is connected by appropriate linkage with a shaft 24. In the details just enumerated, the pressure responsive device does not differ essentially from an ordinary pressure gage, but the shaft 24 instead of effecting the movement of a mere index hand, has fixed thereto a shutter 25. Said shutter might be a solid disk, but as shown it comprises a circumferential zone 26 connected to a central hub 27 by means of radiating arms 28. The circumferential zone 26 is formed in adjacent quadrants with arcuate slots 29 and 30. These slots terminate at one end and substantially at opposite extremes of the diameter of the shutter and they extend at least part-way through adjacent quadrants on the same side of said diameter.

It will be observed from Figure 1 that the shutter is positioned in front of a casing which encloses the Bourdon tube and which comprises front and rear walls 31 and 32 respectively. These walls are provided at alined diametrical points with apertures 33 and 34 capable of being in registry simultaneously with the slots 29 and 30 in said positions of the shutter and to be alternately in and out of registry with one or the other of said slots in other positions of said shutter.

The light sources 3 and 4 may be ordinary mazda lamps continuously illuminated and the beams of which pass through suitable condenser lenses mounted in the forward portions of casings which surround said lamps. The lenses are spaced so that the axes of the beams pass through the alined openings in said shutter and casing walls when the shutter is in favorable position for such passage, and the beams shine upon the photo-electric cells 1 and 2, said cells being suitably shielded except in regions which confront said beams.

In the relative positions of the several instrumentalities as shown in Figure 1, both of the photo-electric cells are being energized, generating currents which pass by way of the circuit connections 35 and 36 respectively, into the photo-electric relays 6 and 7. Said relays are known commercial units and a detailed description of the same is therefore not essential to the exposition of the present invention, excepting that it may be stated that the relays may be identical, each including a solenoid switch 37 and a thermionic amplifier 38 in circuit with said solenoid.

Each of the solenoids 37 closes a power circuit involving the solenoids 39 which actuates the valves 12 and 13.

In the present embodiment of the invention as has been already stated, the furnace beneath the boiler 19 is fed with natural gas under high pressure coming through a conduit 40. The valves 12 and 13 are in branch pipes 41 and 42 which tap the conduit 40 and when said valves are opened by the solenoids 39, the high pressure gas is admitted to the chambers 14 and 15 of the cylinder 16. In this open position of both valves 12 and 13, an equal pressure will be developed on opposite sides of the piston 16 causing the piston to remain in its intermediate position in which the piston rod 18 remains motionless and conditions persist unchanged in the combustion chamber of the furnace. This position of the shutter 25 is maintained when the pressure in the boiler remains constant.

Now, assuming that the pressure in the boiler falls, this causes the Bourdon tube to contract drawing the free end inwardly and rocking the toothed segment 43, see Figure 4, in a clockwise direction. This turns the shaft 24 counter-clockwise and as will be observed from an inspection of Figure 5, displaces the shutter 25 through an angle that causes the occlusion of the apertures 33 and 34, on one side, while maintaining the apertures on the other side in registry with the slot 30.

When this angular movement of the shutter occurs, it is apparent that the beam from the light source 3 is cut off from the photo-electric cell 1, while at the same time continuity of the beam from the light source 4 to the photo-electric cell 2 is perpetuated. The circuit embracing the photo electric cell 1 therefore becomes de-energized, releasing the solenoids 37 with which it is associated, de-energizing the power circuit 8 and therefore releasing the solenoid 39 which controls the valve 12, causing the latter to close. Meanwhile, conditions in the circuits affected by the photo-electric cell 2 remain unchanged, that is to say, the valve 13 remains open. The result is that pressure is cut off in the chamber 14 of the cylinder 16 while the chamber 15 is still open to the source of gas under pressure. The cylinder 16 is provided with bleed conduits 44 and 45, which as indicated in Figure 2, may be connected into the natural gas conduit 46 on the low pressure side of the reducing valve 47, and the gas under pressure originally existing in the chamber 14 quickly escapes, reducing the pressure in said chamber, while the gas in the chamber 15 continues to be supplied faster than it can escape maintaining high pressure within the chamber 15.

The piston 16 thus becomes unbalanced and moves toward the left pulling the piston rod 18 in a direction to open the valve 20 and at the same time to open the damper 21. Thus additional fuel and air is admitted to the furnace, combustion is accelerated and the steam pressure in the boiler is built up. As the steam pressure rises the Bourdon tube 22 expands rotating the shutter in an opposite direction until finally the slot 29 again comes into registry with the adjacent apertures 33 and 34. The beams now once again shine on both of the photo-electric cells, the valve 12 is again opened, pressure rises once more in the cylinder chamber 14, and the piston 16 is once again moved to its intermediate position, restoring the normal conditions of fuel and air supply to the furnace.

Should the pressure within the boiler rise higher than is normal or is desirable, the opposite reaction will occur, that is to say, the shutter 25 will move in a clockwise direction cutting off the energizing beam from the photo-electric cell 2. This causes closing of the valve 13 and reduction of pressure in the cylinder chamber 15 while at the same time pressure in the chamber 14 is maintained. The piston together with the piston rod 18 therefore, moves toward the right, partially closing the fuel valve 20 and the damper 21. Combustion in the furnace is thus reduced and the pressure in the boiler lowered to a point at which the Bourdon tube resumes its normal position in which both of the shutter slots register with the alined apertures 33 and 34. It is thus obvious that by a simple and inexpensive pressure responsive means for controlling the energizing beams of a pair of photo-electric cells arranged in the manner as illustrated and described or in any other suitable manner, novel and effective means have been created for controlling or maintaining a constant pressure by means responsive to variations in the pressure to be maintained and controlled.

In the event that a device constructed according to the present invention is employed on boilers or other pressure maintaining apparatus, subject to severe fluctuation in load, it is desirable to have the piston 16 while dominated by the photo-electric control, operate step by step, with a pause of pre-determined length in each step, the fuel valve or other pressure affecting element being opened a pre-determined amount at each step. At the end of this pre-determined interval, should the steam pressure vary from the desired point, in other words, if at the end of each step both photo-electric cells are not being simultaneously energized, the pressure differential between the closed and opened valve will move the piston another pre-determined distance and this step by step movement will continue until finally the desired pressure has been built up and a balanced condition exists on both ends of the piston.

This step by step sub-control can be brought about by the insertion of a motor driven resetting time limit switch 48, see Figure 7, in series in the power circuits 8 and 9. This switch includes commutators 49, one for each circuit and synchronously rotatable, said commutators having segments contacted by suitable brushes 50. The effect of these time switches is normally to maintain gaps in the power circuits 8 and 9, but at intervals to close said circuits rendering the valve operating solenoids susceptible to the control of the photo-electric cells.

It is of course to be understood that the fluid pressure for actuating the piston or equivalent motor need not be derived from a fluid concerned with the generation of the pressure to be controlled as is the case in the present embodiment, but that it may for instance be derived from a foreign source such as a water main.

While I have in the above description disclosed a practical application of the invention, it is obvious that the particular system as shown and described or the details of construction of the several instrumentalities therein combined, may be varied or modified according to the necessities of use without departing from the spirit and scope of the invention as claimed.

What I claim is:

1. In automatic control of fluid pressure, pressure regulating means, photo-electric actuated means for moving said pressure regulating means in a plus or minus direction with respect to the value of the pressure to be regulated responsive to one or another of selectively controlled light beams, and means movable responsive to variations in the pressure to be regulated, actuating said photo-electric operated means by the selective occlusion of said light beams.

2. In automatic control of fluid pressure, pressure regulating means, means for moving said pressure regulating means in a plus or minus direction with respect to the value of the pressure to be regulated responsive to one or another of selectively controlled light beams, including a fluid pressure actuated element, photo-electrically operated means for supplying fluid pressure to said element, and means movable responsive to variations in the pressure to be regulated for differentially varying the operation of said photo-electrically actuated means by the selective occlusion of said light beams.

3. In automatic control of fluid pressure, pressure regulating means, means for moving said pressure regulating means in a plus or minus direction with respect to the value of the pressure to be regulated, including a fluid pressure actuated element, individual means for supplying fluid pressure selectively with plus or minus effect to said fluid pressure actuated element, photo-electric circuits for each fluid pressure supplying means, each including a light sensitive current varying element, means for projecting a light beam toward each element, and means movable responsive to variations in the pressure to be regulated for selectively occluding one or the other of said light beams.

4. In automatic control of fluid pressure as claimed in claim 3, the beam occluding means comprising a screen having apertures in the axes of said beams, and a rotatable shutter responsive to the fluid pressure to be regulated having arcuate slots registering simultaneously with said apertures in one position of said shutter, said shutter alternately occluding one or the other of said apertures in other positions of said shutter.

5. In automatic control of fluid pressure as claimed in claim 3, the light beam occluding means including a screen having apertures registering with the axes of said beams, rotatable shutter having arcuate slots adapted simultaneously to register with said apertures in one position of said shutter but to alternately occlude one or the other of said apertures in other positions of said shutter, and a vessel in communication with the pressure to be regulated and deformable under variations of said pressure, operatively connected to said shutter.

6. In automatic control of fluid pressure, pressure regulating means, means for moving said pressure regulating means in a plus or minus direction with respect to the value of the pressure to be regulated, including fluid pressure actuated element, individual electrically operated means for supplying fluid pressure selectively with plus or minus effect to said fluid pressure actuated element, said means being in circuit with an adequate power source, and including relays, photo-electric circuits for said relays each including a light sensitive current varying element, means for projecting a light beam toward each element, and means movable responsive to variations in the pressure to be regulated for selectively occluding one or the other of said light beams.

7. In automatic control of fluid pressure, pressure regulating means, means for moving said pressure regulating means in a plus or minus direction with respect to the value of the pressure to be regulated, including a fluid pressure actuated element, electrically operated valves communicating with a source of fluid under pressure and with said pressure actuated element for selectively supplying fluid pressure thereto with plus or minus effect, electric operating means for said valves in circuit with an adequate power source and including relays, photo-electric circuits for said relays each including a light sensitive circuit varying element, means for projecting a light beam toward each element and means movable responsive to variations in the pressure to be regulated for selectively occluding one or the other of said light beams.

8. In automatic control of fluid pressure, pressure regulationg means, and means for moving the same in a plus or minus direction with respect to the value of the pressure to be regulated, including a cylinder and piston the latter having a normal intermediate position in said cylinder, valves communicating with a source of fluid pressure and with said cylinder on opposite sides of said piston, electrical means for operating said valves in circuit with an adequate power source and with relays, photo-electric circuits for said relays, each including a light sensitive current varying element, means for projecting a light beam toward each element, and means movable responsive to variations in the pressure to be regulated, for selectively occluding one or the other or neither of said light beams.

9. In automatic control of fluid pressure, pressure regulating means, means for moving said pressure regulating means in a plus or minus direction with respect to the value of the pressure to be regulated including a fluid pressure actuated element, individual means for supplying fluid pressure selectively with plus or minus effect to said fluid pressure actuated element, photo-electric circuits for each fluid pressure supplying means, each including a light sensitive current varying element, means for projecting a light beam toward each element, means movable responsive to variations in the pressure to be regulated for selectively occluding one or the other or neither of said light beams, and means intercalated in series in said photo-electric circuits providing intermittently closed gaps for imposing a step by step retardation on the control of said current varying elements.

10. Automatic fluid pressure control system including a steam boiler and a conduit for feeding fuel under pressure to the furnace of said boiler, a said conduit including a reducing valve, means for regulating the flow of fuel to said boiler for controlling combustion conditions in the furnace of said boiler, a fluid pressure motor for actuating said regulating means, valves communicating with said fuel conduit on the high pressure side of said reducing valve for supplying fluid under pressure selectively with plus or minus effect to said fluid pressure motor, said motor having bleed passages exhausting into said conduit on the low pressure side of said reducing valve, electrically actuated means for operating said valves, said means being in circuits which includes an adequate power source, and relays, photo-electric circuits for said relays, each including a light sensitive current varying element, means for projecting a light beam toward each element, and light beam occluding means including fixed screen having apertures registering with the axes of said light beams, a rotatable shutter having arcuate slots adapted simultaneously to register with said apertures in one position of said shutter but to alternately occlude one or the other of said apertures in other positions of said shutter, and a vessel in communication with the steam boiler, and deformable under variations of boiler pressure, operatively connected to said shutter.

In testimony whereof I affix my signature.

EDWIN L. DENNIS.